May 24, 1960 G. VON MAGNUS 2,937,876

RECORD PLAYER COMPRISING A DEVICE FOR SETTING DIFFERENT TURNTABLE SPEEDS

Filed Aug. 8, 1958 5 Sheets-Sheet 1

Inventor:

Gerhard von Magnus

May 24, 1960 G. VON MAGNUS 2,937,876

RECORD PLAYER COMPRISING A DEVICE FOR SETTING DIFFERENT TURNTABLE SPEEDS

Filed Aug. 8, 1958 5 Sheets-Sheet 2

Inventor:

Gerhard von Magnus

Inventor:
Gerhard von Magnus

May 24, 1960 G. VON MAGNUS 2,937,876

RECORD PLAYER COMPRISING A DEVICE FOR SETTING DIFFERENT TURNTABLE SPEEDS

Filed Aug. 8, 1958 5 Sheets-Sheet 4

Inventor:

Gerhard von Magnus

May 24, 1960 G. VON MAGNUS 2,937,876

RECORD PLAYER COMPRISING A DEVICE FOR SETTING DIFFERENT TURNTABLE SPEEDS

Filed Aug. 8, 1958 5 Sheets-Sheet 5

Inventor:

United States Patent Office 2,937,876

Patented May 24, 1960

2,937,876

RECORD PLAYER COMPRISING A DEVICE FOR SETTING DIFFERENT TURNTABLE SPEEDS

Gerhard von Magnus, 606 Bartlegrosch, Vaduz, Liechtenstein

Filed Aug. 8, 1958, Ser. No. 753,902

9 Claims. (Cl. 274—9)

Record players are supposed to meet requirements of different kinds, some of which seem to be incompatible. The consumer requires perfect reproduction, simple operation, attractive design and, above all, a reasonable price. As the receiving and amplifying techniques are improved, the requirements to be met by the record player are increased too. Because modern reproducing equipment is most sensitive, a present-day record player must be considered a musical instrument rather than an acousto-electrical apparatus. In view of the increased competition the manufacturer must keep the structural and technical expenditure required to meet the high requirements mentioned hereinbefore within narrow limits. The present invention is based on the recognition that only such a construction of a record player will be successful which meets the requirements mentioned hereinafter with a low expenditure. The invention relates to a record player, in which a stepped pulley is provided between the motor and the turntable for setting different speeds and is engageable by a single idler wheel for transmitting the movement. To this end an extremely flat drive motor of particularly low speed is used so that all speeds required can be obtained.

Various types of record players are known which are provided with an idler wheel for transmitting rotary movement from a stepped pulley, which is driven by a motor, to the turntable rim or to idler rollers of a transmission disposed between the motor and turntable. The idler wheels of the known record players are provided with a friction facing and are generally swung in a radial direction relative to the stepped pulley by means of several levers and links, which are under the action of spring forces. In the swung-out position they are adjusted by one-step increments parallel to the axis of the stepped pulley by means of a rotatable screw spindle or a cam-wheel, after this adjustment the idler rollers are caused to re-engage the stepped pulley. The known devices for setting different speeds do not only require levers and links, with the appertaining springs, for pivotally moving the idler wheel, but also additional bearings in the base plate and turned and milled components such as spindles or the like. The manufacture of these components and the provision of the bearings for the levers in the baseplate of the record player involve considerable expense, adding substantially to the manufacturing costs, which should be kept as low as possible to permit of a reasonable price.

It is an object of the present invention so to construct record players having a speed-changing device that only few parts are required for shifting, which parts can be manufactured in a simple manner and can be mounted without substantial expenditure with the aid of existing components of the record player so that additional bearings in the base plate are eliminated. This object is solved in that in record players, in which a stepped pulley is provided between the motor and the turntable for setting different speeds and is engageable by an idler wheel for transmitting the rotary movement, a cam slot lever, which is connected by a rod to a speed selector and which is preferably provided with engaging surfaces for a radial pivotal movement of the idler wheel and with supporting surfaces which determine the setting thereof in a direction parallel to the axis of the stepped pulley, is rotatably mounted on the turntable shaft itself.

The mounting of the cam slot lever on the turntable shaft itself eliminates the main bearing for the setting device in the baseplate of the record player. It is without significance whether the rotary movement of the stepped pulley is transmitted by the idler wheel directly to the turntable rim or to an idler roller of a transmission interposed between the motor and the stepped pulley. The formation of the cam slot lever with engaging surfaces for a radial pivotal movement of the idler wheel and the provision of the cam slot lever with supporting surfaces for adjusting the idler wheel in the direction parallel to the axis of the stepped pulley has the advantage that a single lever, which is preferably constructed as a stamped or pressed part, is sufficient for all movements for adjusting the idler wheel. Besides, the cam slot lever constructed according to the invention and the mounting thereof on the turntable shaft provides for a concentric arrangement, which is of special advantage in view of the small space which the record player is permitted to occupy.

The cam slot lever is suitably approximately semicircular in plan and has engaging surface having a wave-shaped periphery for pivotally moving the idler wheel and a radially extending supporting surface, which is preferably formed by an angled rim and which consists of appropriate steps and of oblique surfaces connecting said steps, for adjusting the idler wheel in a direction parallel to the axis of the stepped pulley. This construction of the cam slot lever enables an outward pivotal movement of the idler wheel and a displacement thereof into the plane of one of the steps of the stepped pulley and the subsequent inward pivotal movement to be effected by a rotation of the cam slot lever by only a few degrees. In order to transform the small rotary movement of the cam slot lever into a larger outward pivotal movement of the idler wheel the latter is preferably mounted on one arm of a double-armed lever, which is rotatable and displaceable parallel to the axis of the stepped pulley, the shorter arm of which double-armed lever is under the influence of the wave-shaped engaging surface of the cam slot lever whereas its altitude relative to the stepped pulley is determined by its support on the supporting surface of the cam slot lever which is formed by the angled rim.

Because the idler wheel must be brought into frictional engagement with a step face of the stepped pulley and the turntable rim or an idler roller of a transmission, it is suitable not to mount the idler wheel directly on an arm of a double-armed lever, which can only perform pivotal movements about its axis but to rotatably mount the idler wheel on a disc, which is mounted on the arm of the double-armed lever for longitudinal and transverse movements between predetermined stop faces. If one arm of the double-armed lever is connected to a laterally arranged spring, which tends to pivotally move the lever arm and the idler wheel in a radial direction so that the idler wheel engages the stepped pulley as well as the turntable rim or the idler roller, the longitudinally and transversely movable disc carrying the idler wheel will ensure the frictional engagement of the idler wheel for the transmission of the movements.

The frictional engagement of the idler wheel on the stepped pulley and the turntable rim or an idler roller of the transmission will be improved if a spring additionally connected to the disc carrying the idler wheel always tends to move the disc in the direction between the stepped pulley and the turntable rim or the idler roller.

The arrangement of the disc on the arm of the double-armed lever on which the idler wheel is rotatably mounted enables the manufacture of the cam slot lever, particularly of its wave-shaped engaging surface, with much greater manufacturing tolerances because it ensures a compensation during the inward pivotal movement of the idler wheel.

Since each wave crest of the engaging surface of the cam slot lever for effecting the inward and outward pivotal movements of the idler wheel has associated therewith an oblique surface connecting the steps of the supporting surface of the cam slot lever, it is ensured that the idler wheel will be pivotally moved outwardly first, followed by a displacement in a direction parallel to the stepped pulley, whereafter the idler wheel is pivotally moved inwardly to engage the stepped pulley and the turntable rim or an idler roller of the transmission. A spring engaging the double-armed lever ensures that the lever will always be maintained in contact with the supporting surface of the cam lever which is formed by the angled rim thereof.

In order to render the speed-setting device inoperative when the record player is disconnected and to disengage the idler wheel from the stepped pulley when the motor is at a standstill, a deflector for pivotally moving the double armed lever is suitably rotatably mounted on the turntable shaft in addition to the cam slot lever, which deflector is under the action of a spring, which always tends to turn it to its disengaging position whereas during the operation of the record player this deflector is held by a switching slide and a switching lever in a position in which it does not influence the movement of the double-armed lever.

The drawings show a record player constructed according to the invention and provided with a device for setting different turntable speeds.

Figure 1:
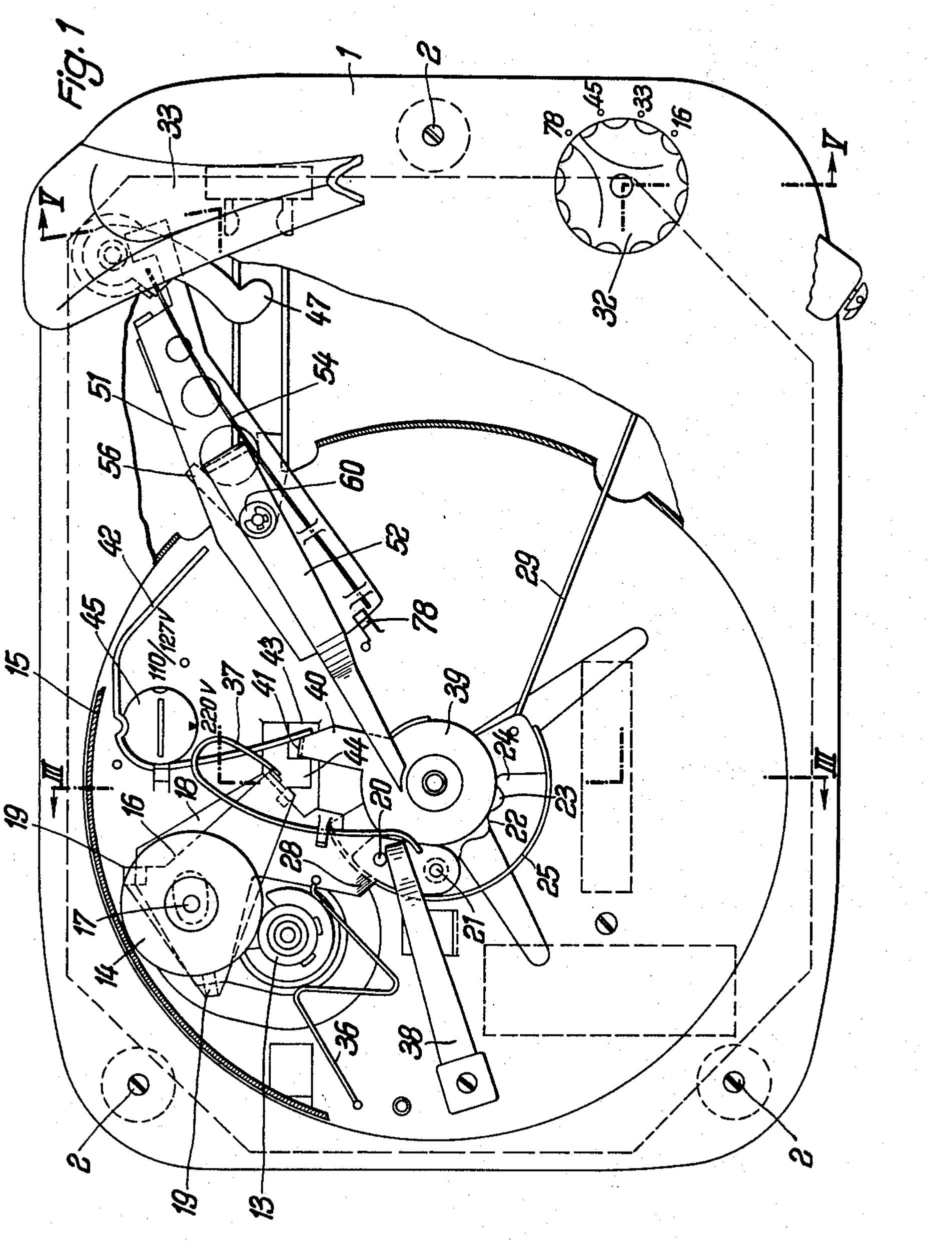
Fig. 1 is a top plan view of the turntable with the turntable and tone arm partially cut away.

In the drawings, 1 is the chassis plate, which is secured to the base plate 5 by the screws 2 and interposed rubber buffers 3 or buffers of other resilient materials, in which screw-thread sleeves 4 are arranged. Thus, vibrations and shakes will not be transmitted to the record player from the outside. As is particularly apparent from Fig. 4 the chassis plate 1 has a recess for receiving the turntable 6, which is mounted in suspension on a turntable shaft 7 nonrotatably affixed in the chassis plate 1. The hub 8 connected to the turntable 6 is calibrated by a ball 9, which provides a point support for the turntable 6 on the turntable shaft 7. The turntable 6 is driven by means of a motor 10, which is received in a bore of the chassis plate 1 with an elastic plug 11 interposed. The space allowed for the record player is small. A certain minimum width is determined by the basic requirement that any commercial record, including those 12 inches in diameter, must be playable. For this reason any reduction in size is possible only in a vertical direction. A flat design is desirable for incorporation in acoustic furniture as well as in portable cases. This leads to the selection of a motor 12 which is constructed as flat as possible, like a flat box, because the motor is the component which mainly determines the depth of the record player. The size of the turntable will determine the weight of the record player. For this reason the diameter thereof should be less than 20 cm. Based on this turntable size, the motor will have a speed of less than 1000 revolutions per minute in the case of a direct transmission if the smallest step of the stepped drive pulley 13 of the motor should not be less than 3.5 mm. in diameter. In accordance therewith the motor 12 has a speed of 950 r.p.m. The motor is constructed as a six-phase condenser motor for a voltage of 110–127 volts. A resistor 65 is arranged in series with the motor 12 for the mainly available voltage of 220 volts.

Figure 3:
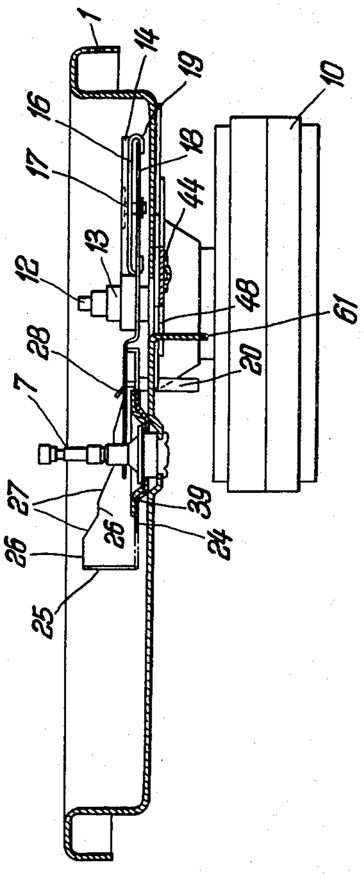
Fig. 3 is a vertical sectional view taken on line III—III of Fig. 1, with the turntable removed.

The motor is mounted in a self-lubricating sintered bearing, which acts like two individual bearings. This is achieved by providing a recess 58 (Fig. 4) in a portion of the motor cover flange, which portion is formed as a bearing sleeve 57, or in a separate sleeve inserted for this purpose in the motor cover. For this reason the bearing bushing 59 consisting of sintered material is oversize and is given its final bore size only by the deformation occurring when it is forced into position. The intermediate recess 58 in the bearing sleeve 59 serves, on the one hand, as a reservoir for lubricant reserves and, on the other hand, ensures that the bearing bushing 59 will be resilient after it has been driven into position. Thus the bearing bushing is formed with an intermediate bulge, which does not engage the motor shaft 12, which is engaged only by the two portions on the bearing ends which are under compression. Because a radial counter-bearing in the lower part of the motor housing is avoided, and this lower part accommodates only an axial thrust bearing, the danger of bearing seizure is eliminated so that the motor may be manufactured with greater tolerance. The cooling has been constructed to ensure high efficiency and silent operation. Another advantage of the selected construction of the motor resides in that the motor 10 can be installed and removed at very low expense. The resilient plug 11 has on its outside diameter a constricted portion, which engages a bore of the chassis plate 1 so that it is sufficient to insert the motor with its bearing sleeve into the plug 11 and to lock it with a locking ring 62. In this way the motor can be installed in very short time in a position in which it is damped against shakes. Sheet metal lugs 61 (Fig. 3) struck out from the plate 1 prevent a deformation of the plug 11 beyond its elastic range, e.g., in the case of prolonged storage in upright position. The installation at the bearing sleeve 57 affords the further advantage that the motor is mounted at the point where it generates the least noise in operation. In this way the transmission of vibration is opposed at its very root. The previous methods adopted to avoid a transmission of bearing noise and motor hum to the chassis are much more complicated and, in most cases, less effective.

The transmission of power from the stepped pulley 13 of the motor 10 to the turntable rim 15 is effected by the single idler wheel 14. In consideration of the requirement that a speed-determining transmitting member must have definite dimensions, which would not be the case if the transmitting members were resilient, the resilient component should be only power-transmitting rather than speed-determining, if possible. This means that it should not be designed as a differential wheel but form only an idler wheel having a given friction diameter. If this idler wheel 14 (Fig. 1) is freely movable in the plane of its bearing, all deviations of this wheel from the ideal circular form will lose their dangerous influence on synchronization. Following this consideration, the moving mass of the idler wheel 14 is kept as small as possible and the idler wheel is mounted for movement in both degrees of freedom (Fig. 4) in such a manner that it will connect the motor shaft 12 through the stepped pulley 13 to the turntable rim 15 by being applied under a pressure which is as constant as possible.

Figure 4:
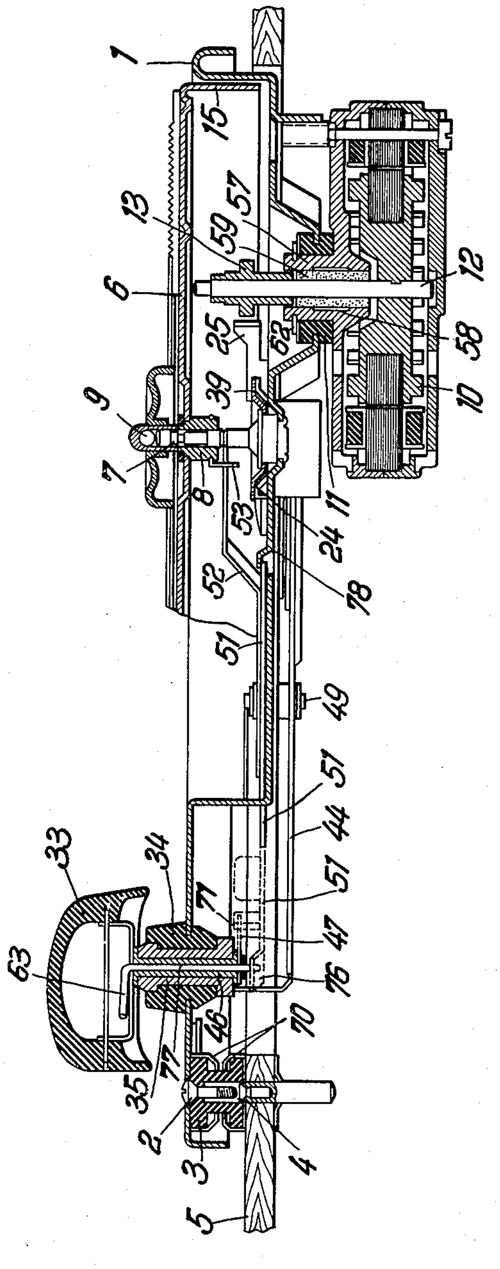
Fig. 4 is a vertical sectional view taken on line IV—IV of Fig. 2.
Figure 5:
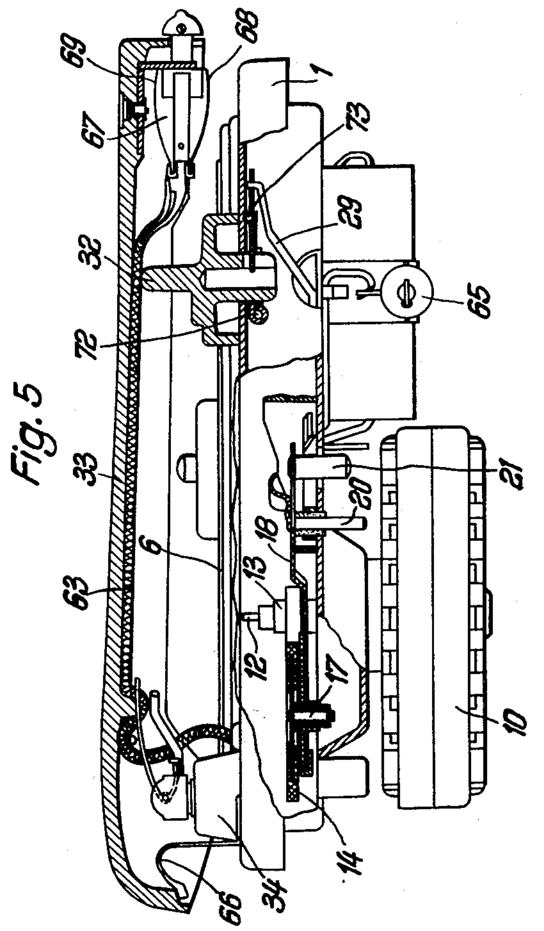
Fig. 5 is a vertical sectional view of the record player, taken on line V—V of Fig. 1.

For this reason the idler wheel 14 is rotatably mounted at 17 on a flat disc 16, which is mounted for longitudinal and transverse movements on one arm of a flat, double-armed lever 18. To limit the movement of the disc 16 on the lever 18 the disc 16 has sheet metal lugs 19, which embrace the edge of the flat lever 18 and are arranged to enable only a slight movement of the disc 16. The double-armed lever 18 which is formed as a stamping, is affixed to the stub shaft 20, which is guided and longitudinally movable and rotatable in a bore of the chassis plate 1. The short lever arm of the lever 18 has affixed thereto at 21 a stop pin, which extends parallel to the axis of the stepped pulley 13 and engages the wave-shaped engaging surface 22 of the cam slot lever 23, which is mounted on the turntable shaft 7. The cam slot lever 23 is approximately semicircular and formed with an aperture 24, which is defined on one side by the wave-shaped engaging surface 22 and on the other side by an angled rim 25 of the cam slot lever 23. The angled rim 25 of the cam slot lever 23 has steps 26 and oblique surfaces 27 between these steps and serves at the same time as a support for the double-armed lever 18. In order to obtain a displacement of the double-armed lever 18 parallel to the axis of the stepped pulley 13 upon a rotation of the cam slot lever 23, a lug 28 of the double-armed lever 18 is angled upwardly to have about the same inclination as the oblique surfaces 27 of the cam slot lever. The cam slot lever 23 is connected by a rod 29 to an adjustable clamp lever 30 mounted on the shaft 31 of the speed selector 32. The clamp lever 30 consists of a bent-up sheet metal lever and is secured below the chassis 1 by means of the screw 74 and a sheet metal lug engaging a longitudinal groove of the shaft 31 to the cylindrical extension of the rotary knob of the speed selector 32 (Figs. 1 and 5). The rotary knob is designed to enable it to be firmly gripped. During the bending operation the screw is inserted into the clamp lever 30 at 72 and serves as a core for embossing the screw threads during the bending and pressing of the lever 72 and remains in this lever. No special thread-cutting operation is required. A ball detent 72' facilitates the exact setting of the desired speed. The speed selector 32 is also designed as a support for the tone arm 33, which is held with a resilient plug 34 interposed in a preferably plastic bearing bushing 35 in the chassis plate 1, as is shown in Fig. 4. The bell-crank lever 77 arranged in the tone arm shaft 46 is axially displaceably constructed to enable the tone arm 33 to be lifted from the record in the supported position. A tension spring 36 provided between the double-armed lever 18 and the chassis plate 1 tends to pivotally move the lever arm 18 together with the disc 16 and the idler 14 in such a manner that the idler wheel 14 engages the stepped pulley 13 and the turntable rim 15. A spring 37 is arranged between the disc 16 carrying the idler wheel 14, on the one hand, and the double-armed lever 18, on the other hand, in such a manner that it always tends to move the disc in the direction between the stepped pulley 13 and the turntable rim 15. A leaf spring 38, which urges the double-armed lever 18 onto the angled rim 25 of the cam slot lever 23, always holds the double-armed lever in engagement with the steps 26 or the oblique surfaces 27 of the cam slot lever. In addition to the cam slot lever 23, a deflector 39 is rotatably mounted on the turntable shaft 7 and has a lever arm 40 with an angled portion 41, which is under the action of the spring 42 and moves against the force of the spring 42 through an opening in the chassis plate 1 into an aperture 43 of a switching slide 44 and is held by the latter. The spring 42 serves also as a detent spring for the voltage selector knob 45, which forms an abutment for the spring. The spring 42 is strained by means of the switching slide 43, which is carried along by a switching lever 47, connected to the tone arm shaft 46, during the outward pivotal movement of the tone arm. The switching lever 43 is formed as a flat sheet metal part and has firmly connected thereto a plate 48 of insulating material, which carries switch contacts for switching the record player on and off. Thus the switch is constructed as a slide switch for controlling the main supply for the motor and the short circuit for the audio-frequency cable 63 in such a manner that the short circuit of the cable 63 overlaps the mains switching operations in time. This avoids a reception of the motor switching noise by the amplifier and ensures a silent switching. The voltage selector 45 is so constructed that its setting, which is usually effected only once, can be performed without tools when the turntable has been lifted. A resistor is bridged for a voltage of 110–127 volts. This precludes any functional disturbances due to inadequate contact of the voltage selector in the most frequent case of a mains voltage of 220 volts.

Figure 2:
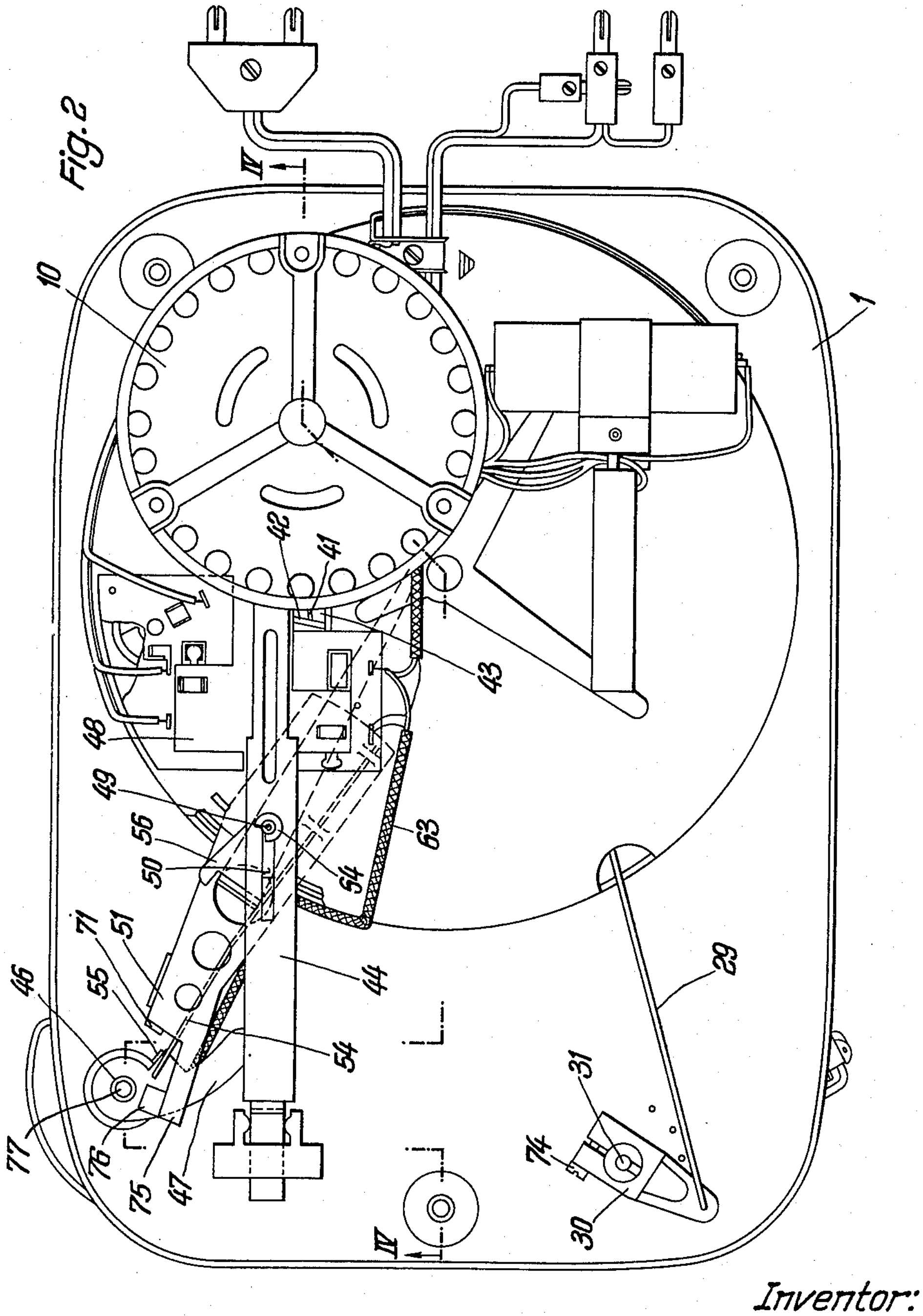
Fig. 2 is a bottom view of the record player.

The pin 49, which holds the switching slide 44 in a longitudinal slot 50 serves for guiding the switching slide 44 as well as for mounting a switching lever 51, which has affixed thereto a driver lever 52, which is engaged by a driver spring 53 on the hub 8 of the turntable 6. The pivot 49 is held in a bore of the chassis plate 1. Being mounted on the movable switching lever 51 the driver lever 52 serves as a slip coupling and its weight provides for the necessary re-engaging force. A felt ring 64 forced over the pin 49 (Fig. 2) may be used to increase the re-engaging force in order to avoid an undesired slipping off of the driver in the case of shakes or inclined positions. Besides, the felt ring will avoid resonant vibration of the otherwise exposed driver lever. When the tone arm 33 has been pivotally moved outwardly, a spring 54 consisting of a straight piece of spring wire and affixed to the switching lever 51 will engage with its free end the stop 55 of the switching lever 47 and the locking lever 56, which together with the switching lever 52 is rotatably mounted on the pin 49. This spring 54 then causes the locking lever 56 to be moved to a position in which it locks the switching slide 44 against the force of the spring 42 when the record player has been switched on.

The automatic disconnector responds to the increased lead of the run-out groove of all records of any size and has, inter alia, the advantage that it does not require any manufacturing precision and yet is reliable in function. This is primarily achieved by avoiding a slip coupling, as is used in most cases. During the playing of the record the tone arm is left perfectly unaffected until the diametral range is reached in which the largest possible run-out grooves begin and is only slightly affected during the reproduction in the range in which the disconnector is effective because sensitive amplifiers will reproduce even slight disturbing noise.

The tone arm bearing combines a surprisingly simple installation with functional advantages. The plug 34 which may consist of soft rubber, is inserted in the chassis 1 and receives the bearing sleeve 35 of the tone arm 33. In this way the tone arm bearing is resiliently connected without any screws, rivets or the like, to the chassis 1 in a reliable manner and so as to isolate vibration. The same plug 34 holds the detent spring 66 for the tone arm 33 nonrotatably in the chassis bore so as to prevent it from chattering. The detent spring 66 urges the tone arm 33 in its position of rest gently against the tone arm support provided by the speed selector 32 and enables the blind finding of the correct angle through which the tone arm must be swung inwardly to insert it into the initial groove of records of the three conventional sizes. For this tangible detent the tone arm 33 requires a relatively large overhang at the bearing. This requirement is met by the shape of the arm, the ogival contour of which ensures a high rigidity against twisting and freedom from disturbing natural resonance.

In selecting the sound system 67, importance has been primarily attached to a good frequency response curve. This means that the frequency range is wide and has a characteristic smiliar to an inversion of the characteristic governing the cutting of gramophone records. Special attention is given to the slightly boosted bases. Close reference tolerances ensure a considerable uniformity regarding the transmission level, frequency response curve and signal to noise ratio. The sapphire needles 68, 69 can be individually replaced without involving danger to the crystals. The needles can be moved to a safety position without requiring additional protective caps. The markings for appertaining settings of the sound system and of the speed are provided in the same colour.

The means for mounting the parts of the record player on the base plate are constructed to withhold vibration and shakes from the outside. This construction prevents the base plate from becoming a resonant body for chassis vibrations. The base plate acts as an isolator for structure-born noise. Metal springs always tending to produce contact vibrations, buffer members 3 of resilient material such as rubber are used as isolators. Socket members 70 of sheet metal provide for a positive centering of the entire apparatus after the screws 2 extending through the buffers 3 have been inserted in the threaded sleeve 4 and have been tightened. In playing position the chassis is carried only by the three buffers 2, 3 (Fig. 1). When the screws 2 have been inserted into the screw-threaded sleeves 4, the apparatus is in condition for transport, in which it can be dispatched without chattering. This satisfies the desire of the users and dealers for a transport locking means which cannot be lost.

When the switching lever 51 is locked, e.g. by noses 78 bent upwardly from the chassis bottom, against tilting under a tip load (Figs. 1 and 4) and if it is shaped for higher rigidity, e.g. by having a vertical lever flank, an angled extension 76 of the tip of this lever 54 may have an oblique surface 71 (Fig. 2), which is urged below the bell-crank lever longitudinally displaceably mounted in the tone arm shaft at the time of disconnecting in such a manner that the tone arm is lifted from the record. Whereas this function is known with record changers it is not known with single record players and is desirable because the slightest lateral displacement of the tone arm during its lifting from the record is liable to cause damage to the record as well as to the sapphire.

The mode of operation of the record player, particularly of the speed-changing device, will be readily apparent from the drawing. In the switched-on condition shown in the drawings a rotation of the speed selector 32 will pivotally move the clamp lever 30 connected thereto. The pivotal movement of the latter is transmitted by the rod 29 to the cam slot lever 23, which is rotated about the turntable shaft 7 so that the double armed lever, the engaging pin 21 of which lies in a wave trough of the engaging surface 22 of the cam slot lever 23, is swung about its shaft 20 at the beginning of the rotary movement of the cam slot lever. By this pivotal movement of the double-armed lever that lever arm of the lever 18 which carries the disc 16 and with it the idler wheel 14 is swung about the shaft 20 in the clockwise sense against the force of the springs 36 and 37 so that the idler wheel 14 is disengaged from the stepped pulley 13 and the turntable rim 15. As the movement of the cam slot lever 23 is continued, the support of the double-armed lever 18 on the angled rim 25 of the cam slot lever 23 will cause the lever 18 to be lifted or lowered to an adjacent step 26, depending on the direction of rotation of the cam slot lever 23, in a direction parallel to the axis of the stepped pulley 13, by way of one of the oblique faces 27 of the rim 25, so that the idler wheel is moved into a plane of another step of the stepped pulley 13. Only towards the end of the adjusting movement does the engaging pin 21 of the double-armed lever 18 enter the next wave trough of the engaging surface 22 of the cam slot lever 23, whereby the idler wheel 14 is now swung inwardly, opposite to the outward pivotal movement, to engage the turntable rim 15 and the stepped pulley 13 on a step which is adjacent to the initial position. When the record player is disconnected the engaging pin 21 of the double-armed lever 18 engages the deflector 39 and is thus clear of the engaging surface 22 of the cam slot lever 23. As a result, the idler wheel 14 is also clear of the stepped pulley 13 and the turntable rim 15. During the rotation of the speed selector 32 the rotary movement of the cam slot lever 23 causes the double-armed lever 18 to be lifted or lowered parallel to the axis of the stepped pulley 13 and the wave-shaped engaging surface 22 of the cam slot lever 23 is rotated so that the engaging pin 21 will engage the engaging surface 22 in a wave trough associated with that step of the supporting surface of the cam slot lever 23 which supports the lever 18. This lifting or lowering of the double-armed lever is performed without a pivotal movement of the idler wheel 14.

Thus, various speeds can be set without difficulty while the record player is at a standstill or in operation.

The pivotal movement of the idler wheel against the spring forces required to keep the idler wheel in engagement during the operation of the record player, and the adjustment of the idler wheel in a direction parallel to the axis of the stepped pulley also against the action of a spring which ensures a reliable engagement on the respective supporting surfaces, require considerable forces, which will stress the bearings of the setting device. The solution provided by the invention to use the turntable shaft, which is fixed in the chassis of the turntable to provide for the necessary smooth running of the turntable, also as a bearing for the setting device and to effect the setting by means of a cam slot lever which is rotatably mounted on the turntable shaft and effects both the pivotal movement and the vertical displacement of the idler wheel, enables a space-saving, simple construction of the record player; this has a favourable effect also on the manufacturing costs of the equipment.

What is claimed is:

1. In a record player having a chassis, a pick-up, a turntable, a shaft rotatably mounting the turntable, a drive motor, a change-speed transmission and speed selection between the drive motor and said turntable, said change-speed transmission comprising a stepped pulley, an idler wheel adapted to engage said stepped pulley and the rim of said turntable, a double-armed lever, said idler wheel arranged on one arm of said double-armed lever, a stub shaft for mounting said lever in said chassis, means for axially displacing and for pivotally moving said lever, said means constructed as a cam slot lever, the improvement of said cam slot lever being pivotally mounted on the shaft of the turntable, said cam slot lever having engaging surfaces adapted to effect a pivotal movement of said double-armed lever and having supporting surfaces adapted to effect an axial displacement of said double-armed lever, a linkage connecting said cam slot lever to said speed selector, said actuating linkage being adapted to transmit setting movements of the selector to said change-speed transmission.

2. The improvement as set forth in claim 1, comprising a lever which is constructed as a deflector, said lever being arranged on the shaft of the turntable in addition to the cam slot lever, said lever being adapted to be moved by means of a spring and of a switching slide into engaging and disengaging positions and in the disengaging position so to engage said double-armed lever that said idler wheel is disengaged from the stepped pulley and from the rim of the turntable, said lever being adapted to release the double-armed lever in the engaging position.

3. In a record player having a chassis, a pick-up, said pick-up having a bearing sleeve, said bearing sleeve being adapted to guide the tone arm shaft, resiliently yielding materials such as rubber, plastics or the like arranged between said bearing sleeve and the chassis, said resilient materials being formed as plugs and affixed in the aperture of the chassis, a turntable, a shaft rotatably mounting the turntable, a drive motor, a change-speed transmission and speed selector between the drive motor and said turntable, said change-speed transmission comprising a stepped pulley, an idler wheel adapted to engage said stepped pulley and the rim of said turntable, a double-armed lever, said idler wheel arranged on one arm of said double-armed lever, a stub shaft for mounting said lever in said chassis, means for axially displacing and for pivotally moving said lever, said means constructed as a cam slot lever, the improvement of said cam slot lever being pivotally mounted on the shaft of the turntable, said cam slot lever having engaging surfaces adapted to effect a pivotal movement of said double-armed lever and having supporting surfaces adapted to effect an axial displacement of said double-armed lever, a linkage connecting said cam slot lever to said speed selector, said actuating linkage being adapted to transmit setting movements of the selector to said change-speed transmission.

4. In a record player having a chassis, a pick-up, a turntable, a shaft rotatably mounting the turntable, a drive motor, said motor comprising a bearing sleeve adapted for fixing said motor in said chassis, resiliently yielding materials such as rubber, plastics or the like arranged between said bearing sleeve and the chassis, said resilient materials being formed as plugs and affixed in the aperture of the chassis, a turntable, a shaft rotatably mounting the turntable, a drive motor, a change-speed transmission and speed selector between the drive motor and said turntable, said change-speed transmission comprising a stepped pulley, an idler wheel adapted to engage said stepped pulley and the rim of said turntable, a double-armed lever, said idler wheel arranged on one arm of said double-armed lever, a stub shaft for mounting said lever in said chassis, means for axially displacing and for pivotally moving said lever, said means constructed as a cam slot lever, the improvement of said cam slot lever being pivotally mounted on the shaft of the turntable, said cam slot lever having engaging surfaces adapted to effect a pivotal movement of said double-armed lever and having supporting surfaces adapted to effect an axial displacement of said double-armed lever, a linkage connecting said cam slot lever to said speed selector, said actuating linkage being adapted to transmit setting movements of the selector to said change-speed transmission.

5. The improvement as set forth in claim 3, comprising struck-out sheet metal lugs on stationary parts, said lugs adapted to support resiliently mounted parts in prolonged substantially inclined positions.

6. The improvement as set forth in claim 3, comprising a chamber-shaped recess in the bore of the bearing sleeve of the motor, a bearing bushing of sintered material forced in said bearing sleeve, said bearing bushing being bulged into said chamber-shaped recess, said chamber-shaped recess being adapted to receive a supply of lubricant.

7. In a record player having a chassis, a pick-up, a turntable, a shaft rotatably mounting the turntable, a drive motor, a change-speed transmission and speed selector between the drive motor and said turntable, said change-speed transmission comprising a stepped pulley, an idler wheel adapted to engage said stepped pulley and the rim of said turntable, a double-armed lever, said idler wheel arranged on one arm of said double-armed lever, a stub shaft for mounting said lever in said chassis, means for axially displacing and for pivotally moving said lever, said means constructed as a cam slot lever, the improvement of said cam slot lever being pivotally mounted on the shaft of the turntable, said cam slot lever having engaging surfaces adapted to effect a pivotal movement of said double-armed lever and having supporting surfaces adapted to effect an axial displacement of said double-armed lever, a linkage connecting said cam slot lever to said speed selector, said actuating linkage being adapted to transmit setting movements of the selector to said change-speed transmission, said improvement comprising means for automatically deenergizing the record player, said means being adapted to effect said deenergization in dependence on the entrance of a sound groove scanning element in the run-out groove of the record, said means consisting of a driver spring, said driver spring being connected to said turntable and rotating therewith, a driver lever, a pivot pin adapted to mount said driver lever in the chassis, said driver spring being adapted to pivotally move said driver lever about said pivot pin, a switching lever, said switching lever arranged on the pivot pin, said switching lever engaging said driver lever and adapted to transmit the movements of said sound groove scanning element to the driver lever.

8. The improvement as set forth in claim 7, a felt disc arranged on said pivot pin between said switching lever and said driver lever, said felt disc being adapted to establish a frictional connection between the switching lever and driving lever.

9. The improvement as set forth in claim 7, said switching lever having an extension which is directed toward the tone arm shaft and formed with an oblique surface, said rim being adapted to displace a bell-crank lever in the tone arm shaft parallel to the shaft of the turntable at the time of deenergization, said bell-crank lever being adapted to lift the tone arm from the record.

References Cited in the file of this patent

UNITED STATES PATENTS

| | | |
|---|---|---|
| 1,554,621 | Boynton | Sept. 22, 1925 |
| 1,684,984 | Claus | Sept. 18, 1928 |
| 2,331,122 | Jones | Oct. 5, 1943 |
| 2,608,411 | Fisher | July 15, 1949 |

FOREIGN PATENTS

| | | |
|---|---|---|
| 683,150 | Great Britain | Nov. 26, 1952 |
| 1,059,248 | France | Nov. 10, 1953 |
| 294,750 | Switzerland | Nov. 30, 1953 |
| 1,133,804 | France | Nov. 26, 1956 |